(12) United States Patent
Grollo (10) Patent No.: US 9,371,800 B2
(45) Date of Patent: Jun. 21, 2016

(54) ENGINE FOR USE IN AN AERIAL VEHICLE

(75) Inventor: Mark Grollo, Heidelberg (AU)

(73) Assignee: GROLLO AEROSPACE, Thornbury, Victoria (AU)

( * ) Notice: Subject to any disclaimer, the term of this patent is extended or adjusted under 35 U.S.C. 154(b) by 236 days.

(21) Appl. No.: 14/002,292

(22) PCT Filed: Feb. 29, 2012

(86) PCT No.: PCT/AU2012/000195
§ 371 (c)(1),
(2), (4) Date: Oct. 28, 2013

(87) PCT Pub. No.: WO2012/116398
PCT Pub. Date: Sep. 7, 2012

(65) Prior Publication Data
US 2014/0047816 A1  Feb. 20, 2014

(30) Foreign Application Priority Data

Mar. 1, 2011  (AU) .............................. 2011900693

(51) Int. Cl.
| | |
|---|---|
| *F02K 1/00* | (2006.01) |
| *F02K 7/18* | (2006.01) |
| *F02K 1/12* | (2006.01) |
| *F02K 9/78* | (2006.01) |
| *F02K 9/86* | (2006.01) |
| *F02K 9/97* | (2006.01) |

(52) U.S. Cl.
CPC .............. *F02K 7/18* (2013.01); *F02K 1/1223* (2013.01); *F02K 9/78* (2013.01); *F02K 9/86* (2013.01); *F02K 9/972* (2013.01)

(58) Field of Classification Search
CPC ............ F02K 9/64; F02K 9/97; F02K 9/972; F02K 1/822; F02K 9/78; F02K 9/74; F02K 9/76; F02K 9/766; F02K 7/18; F02C 7/224; B23P 15/008
See application file for complete search history.

(56) References Cited

U.S. PATENT DOCUMENTS

| | | | | |
|---|---|---|---|---|
| 2,518,000 | A * | 8/1950 | Goddard | F02K 7/18 60/257 |
| 3,161,378 | A * | 12/1964 | Creasey | B64C 30/00 244/53 B |
| 3,237,400 | A * | 3/1966 | Kuhrt | F02C 1/007 602/246 |
| 3,279,187 | A | 10/1966 | Lindman | |
| 4,747,543 | A * | 5/1988 | Madden | F02K 1/12 239/127.3 |
| 4,934,600 | A * | 6/1990 | Nash | F02K 1/006 239/127.1 |

(Continued)

OTHER PUBLICATIONS

Grollo Aerospace, International Application No. PCT/AU2012/000195, International Preliminary Report on Patentability, Dec. 11, 2012.

(Continued)

*Primary Examiner* — Gerald L Sung
(74) *Attorney, Agent, or Firm* — Michael G. Johnston; Moore & Van Allen PLLC (57) ABSTRACT

This invention relates to an engine (2) for use in aerial vehicle (1) including a rocket (9) and ram jet engine formed from an intake (8) and a combustion chamber (10). The rocket engine (9) includes an oxidiser combustion chamber (21) which exhausts through the combustion chamber (10). The engine also includes a nozzle (12). Both the intake (8) and nozzle (12) include rectilinear ducts which are defined in part by baffles (16) and panels (33) respectively. Both the baffles (16) and panels (33) are adjustable to adjust the airflow characteristics therethrough.

15 Claims, 5 Drawing Sheets

(56) References Cited

U.S. PATENT DOCUMENTS 5,078,341 A * 1/1992 Bichler .................. B64D 33/02
  137/15.1
5,787,703 A  8/1998 Fougerousse

OTHER PUBLICATIONS

Grollo Aerospace, International Application No. PCT/AU2012/000195, International Search Report, Mar. 15, 2012.

* cited by examiner

ENGINE FOR USE IN AN AERIAL VEHICLE

FIELD OF THE INVENTION

This invention relates to an engine for use in an aerial vehicle. The engine has a particular application in propelling an unmanned vehicle (UAV) to super sonic speeds and it will be convenient to hereinafter describe the invention in reference to this application. It ought to be appreciated however that the engine may have other applications, and the invention is not limited to use with a UAV.

A UAV may be described as a relatively small aerial vehicle that does not carry its own human operator. Instead it is piloted remotely or can fly autonomously. As the vehicle does not carry an operator they are often perceived as relatively expendable, however it may also be desirable that the UAV be recovered and reused. In this regard it is distinguishable from a missile which not intended for reuse. Instead a missile is designed to be destroyed during use or is sufficiently damaged so as to limit its ability to be reused.

UAV's can be used for a number of purposes including reconnaissance, carrying and deploying payloads both lethal and non lethal, providing attack capabilities and acting as a decoy. It is often desirable that the UAV be capable of travelling at significant speeds while operating in these roles. This is particularly the case where the UAV may be operating in a hostile environment where speed is its primary form of defense. It is also the case where the UAV is acting as a decoy mimicking an aerial vehicle that presents a virtual hostile threat.

It is becoming increasing desirable that the UAVs be capable of travelling at higher speeds. The inventor has appreciated that a UAV that travels at supersonic speed is likely to be most desirable. Throughout this specification the term supersonic speed will be used and it is intended that this represent speeds in the range of Mach 1 to Mach 5. Whilst some missiles can travel at supersonic speed, their method of propulsion includes a rocket engine that relies on carrying and combining fuel and an oxidizer. This means they tend to operate for a period of time that are proportional to their size Accordingly a missile engine is not suitable for use in a UAV as the UAV is relatively small and therefor has limited space for carrying the fuel and oxidizer required to operate for longer periods of time.

It is therefore desirable to produce an engine suitable for use with an aerial vehicle that is relatively compact. It is preferable for the engine to be capable of operating over extended periods of time, and reaching supersonic speeds.

A reference herein to a patent document or other matter which is given as prior art is not to be taken as an admission that that document or matter was, in Australia, known or that the information it contains was part of the common general knowledge as at the priority date of any of the claims.

An engine for use in an aerial vehicle including: an air intake at a leading end of the engine, a nozzle at a tail end of the engine, an air fed combustion chamber that is fed air from the intake to burn liquid fuel and discharge from the engine through the nozzle, a rocket located proximate the intake that operates on the liquid fuel and an oxidizer, the rocket having an oxidizer fed combustion chamber within which the liquid fuel and oxidizer is burnt and an exhaust discharging the burnt fuel into the air fed combustion chamber, whereby the fuel is supplied to the oxidizer fed combustion chamber until the vehicle achieves a self sustaining velocity after which the fuel is supplied to the air fed combustion chamber, the air fed combustion chamber discharging into the nozzle, the nozzle including a rectilinear duct having at least one adjustable panel for adjusting the flow characteristics of the discharge moving through the nozzle, each panel includes a first conduit formed therein through which conduit the fuel passes before it enters said air fed combustion chamber, whereby heat is transferred from each panel to the fuel, the intake includes a substantially rectilinear duct and includes a plurality of baffles which are adjustable in two dimensions and located on opposing sides of the intake for adjusting the flow characteristics of air interacting with the intake.

It is preferred that the intake includes a substantially rectilinear duct and at least one adjustable baffle for adjusting the flow characteristics of air interacting with the intake. It is further preferred that the intake include a plurality of baffles which are adjustable in two dimensions and located on opposing sides of the intake. It is further preferred that each baffle is articulated and includes at least a lead portion and a tail portion that are relatively adjustable in an angle they make with each other. It is still further preferred that each baffle includes a middle portion positioned between the lead portion and the tail portion that is relatively adjustable in an angle it makes with the lead portion and the tail portion.

It is preferred that the engine a conduit formed in a wall forming at least the oxidizer fed combustion chamber through which conduit the fuel passes before it enters said chamber, whereby heat is transfer from the wall of said chamber to the fuel. It is further preferred that the conduit extends to a wall forming the exhaust. It is still further preferred that the conduit defines a substantially helical path. It is still further preferred that the exhaust creates a venturi effect to draw air in through the intake duct.

It is preferred that the engine include at least one fuel injector for injecting the fuel towards the air fed combustion chamber, at least one flame holder over which the air passes and causes an eddy current which supports an environment in which a flame for igniting the fuel can be maintained. It is further preferred that the engine include a conduit formed in a wall forming the oxidizer fed combustion chamber through which conduit the fuel passes before it enters said oxidizer fed combustion chamber, whereby heat is transfer from the wall of said oxidizer fed combustion chamber to the fuel. It is still further preferred that the conduit defines a substantially helical path.

It is further preferred that the nozzle includes a plurality of panels which are located on opposing sides of said duct. It is still further preferred that each panel is articulated and includes at least a lead portion and a tail portion that are relatively adjustable in an angle they make with each other. It is still further preferred that the nozzle includes side walls that extend substantially perpendicular to and on opposing sides of the panels, each side wall including a conduit formed therein through which conduit the fuel passes before it enters either of said chambers, whereby heat is transfer from each side wall to the fuel. It is still further preferred that each conduit defines a tortuous path.

It is preferred that the rocket is an ejector rocket.

It will be convenient to hereinafter describe the invention in greater detail with reference to the accompanying drawings which illustrate a preferred embodiment of the invention. The particularity of drawings and the detailed description should not be understood as superseding the generality of the preceding definition of the invention.

DETAILED DESCRIPTION OF THE DRAWINGS

Figure 1:
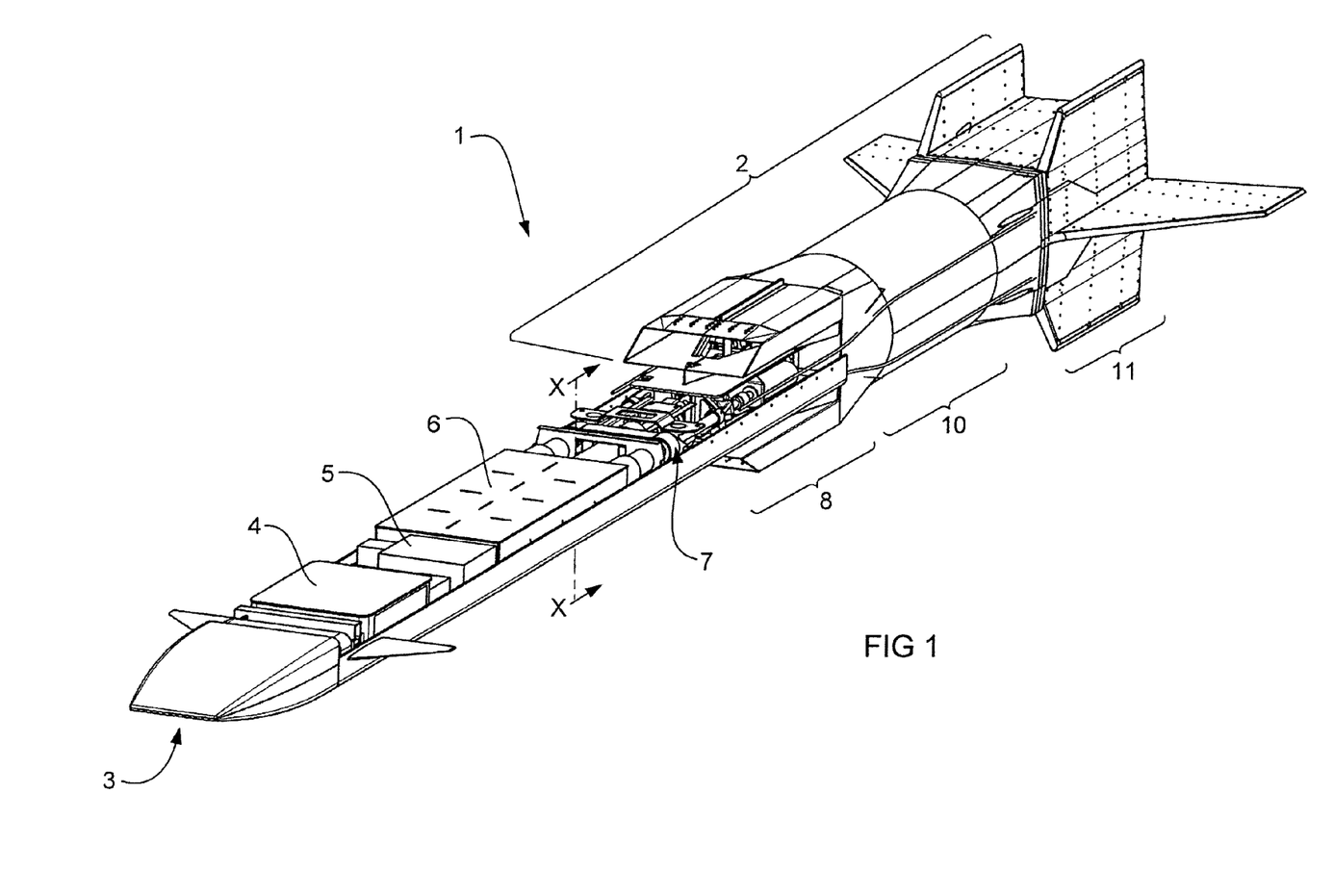
FIG. 1 is an isometric view of the unmanned aerial vehicle according to a preferred aspect of the invention.

Referring now generally to FIG. 1 which illustrates an example of an unmanned aerial vehicle (UAV) 1 including an engine 2 according to a preferred embodiment of the invention. A part of the outer skin of the UAV 1 has been removed to expose some of the elements of the engine 2. In summary, FIG. 1 illustrates components of the of the UAV 1 and commencing at a nose 3 of the UAV 1 there is a management system 4, a motor controller 5, a fuel tank 6, a gearbox 7, an intake 8, a rocket 9 (see FIG. 2), an air fed combustion chamber 10 and an empennage 11.

The management system 4 may take any form that is suitable for managing the components of the UAV 1. It may for example include communication systems for communicating with the other components of the UAV 1 and relaying the data to the remote operator. However the specifics of the management system do not for part of the invention.

The motor controller 5 may take any form with its function is to control the rocket 9 and intake/combustion chamber 8, 10. However the specifics of the motor controller 5 do not form part of the invention.

The rocket 9 operates on fuel supplied from the fuel tank 6, and an oxidizer supplied from a separate tank (not shown). The air fed combustion chamber 10 operates on the same fuel supplied from the tank 6 that is supplying the rocket 9. The configuration of the tank 6 as illustrated may vary and specifics of the tank 6 do not form part of the invention.

The gearbox, intake, rocket, air combustion chamber and empennage will be described in greater detail with reference to later illustrations.

Figure 2:
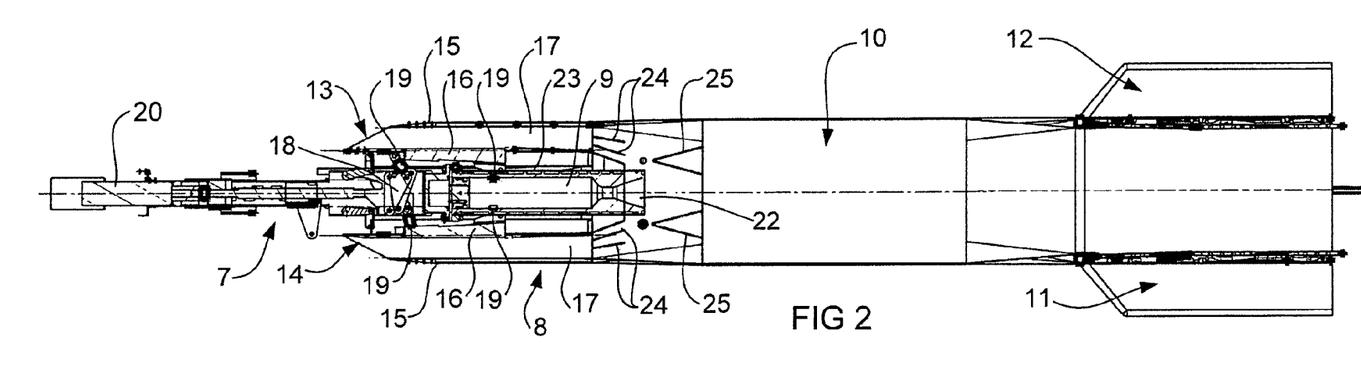
FIG. 2 is a cross-sectional view through XX of FIG. 1 in a subsonic mode.
Figure 6:
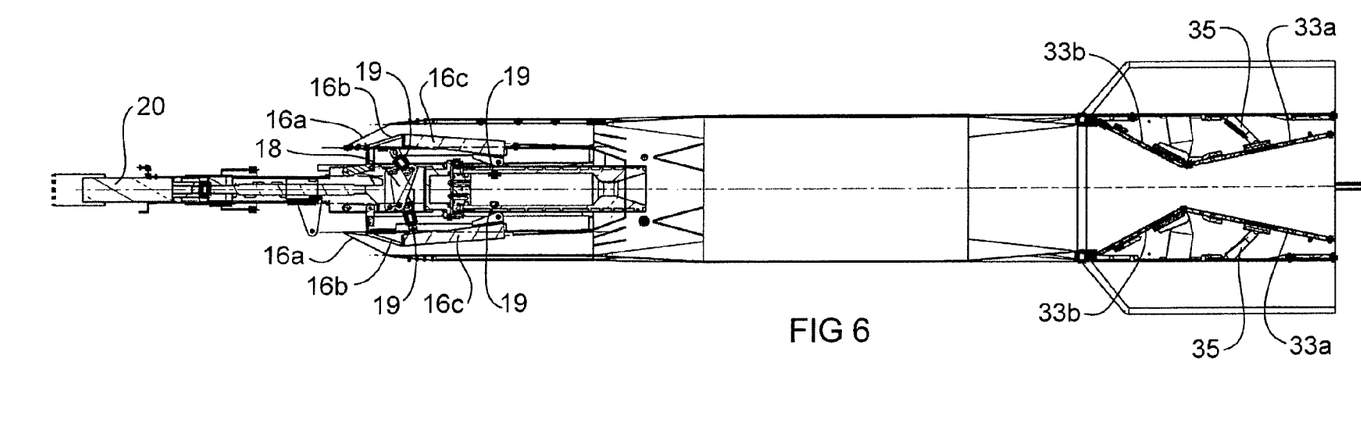
FIG. 6 is a cross-sectional view through XX of FIG. 1 in a supersonic mode.

Referring now to FIG. 2 which illustrates the engine 2 in greater detail through a cross section XX of FIG. 1. FIG. 2 illustrates in summary the gearbox 7, the intake 8, the rocket 9, the air combustion chamber 10 and a nozzle 12 forming part of the empennage 11. The engine 2 the subject of the invention is not limited to including the empennage 11 as illustrated having horizontal and vertical fins, and may be formed in an entirely different empennage 11. The intake 8 includes an upper opening 13 and a lower opening 14 on opposing sides of the gearbox 7 through which air enters the engine 2. Each opening 13, 14 is defined between an outer skin 15 and a baffle 16 which leads to a substantially rectilinear duct 17. Each baffle 16 is preferably adjustable so as to adjust the flow characteristics of air entering and moving through the intake 8. Each baffle 16 may be adjustable in any suitable manner to achieve this result and the manner hereinafter described is merely one preferred manner of adjustability. FIG. 6 illustrates each baffle being articulated and including a lead portion 16a, a middle portion 16b and a tail portion 16c which are each adjustable in the angle they make with each other. FIGS. 2 and 6 illustrate a series of linkages 18 and arms 19 which are used to adjust the angle of the lead portion 16a, middle portion 16b and tail portion 16c. The linkages 18 and arms 19 are adjusted trough actuation of rams in the gearbox. Clearly other forms of adjustment and articulation of the baffles 16 are possible. The result of this adjustment will be described with reference to latter illustrations.

FIG. 2 also illustrates a preferred embodiment of the rocket 9 which includes an oxidizer fed combustion chamber 21 and an exhaust 22. Liquid fuel and oxidizer is supplied to the oxidizer fed combustion chamber 21 as hereinbefore explained. The oxidizer and liquid fuel may be supplied in any suitable manner and the invention is not limited to the supply in any particular arrangement. However it is preferred that at least the liquid fuel be supplied to the oxidizer fed combustion chamber 21 via a conduit 23 (referred to in the claims as the second conduit) shown as checkouts in a wall forming the oxidizer fed combustion chamber 21. The conduit 23 is preferably helical as it passes along the length of the wall of the chamber 21, however the conduit 23 may take another path. More specifically the conduit 23 may take a more tortuous path or alternatively a direct path to the oxidizer fed combustion chamber 21. Passing the liquid fuel along this conduit 23 allows the fuel to be preheated before combustion and helps to reduce the temperature of the wall of the oxidizer fed combustion chamber 21. Reducing the temperature of the wall increases the life span of the combustion chamber 21. It should also be noted from FIG. 2 that the conduit extends along the wall of the exhaust 22 of the rocket 9 also to achieve the same function. FIG. 2 also illustrates the rocket exhaust 22 discharging spent gas into the air fed combustion chamber 10. This spent gas produces thrust and discharges through the nozzle 12 of the engine 2.

Figure 3:
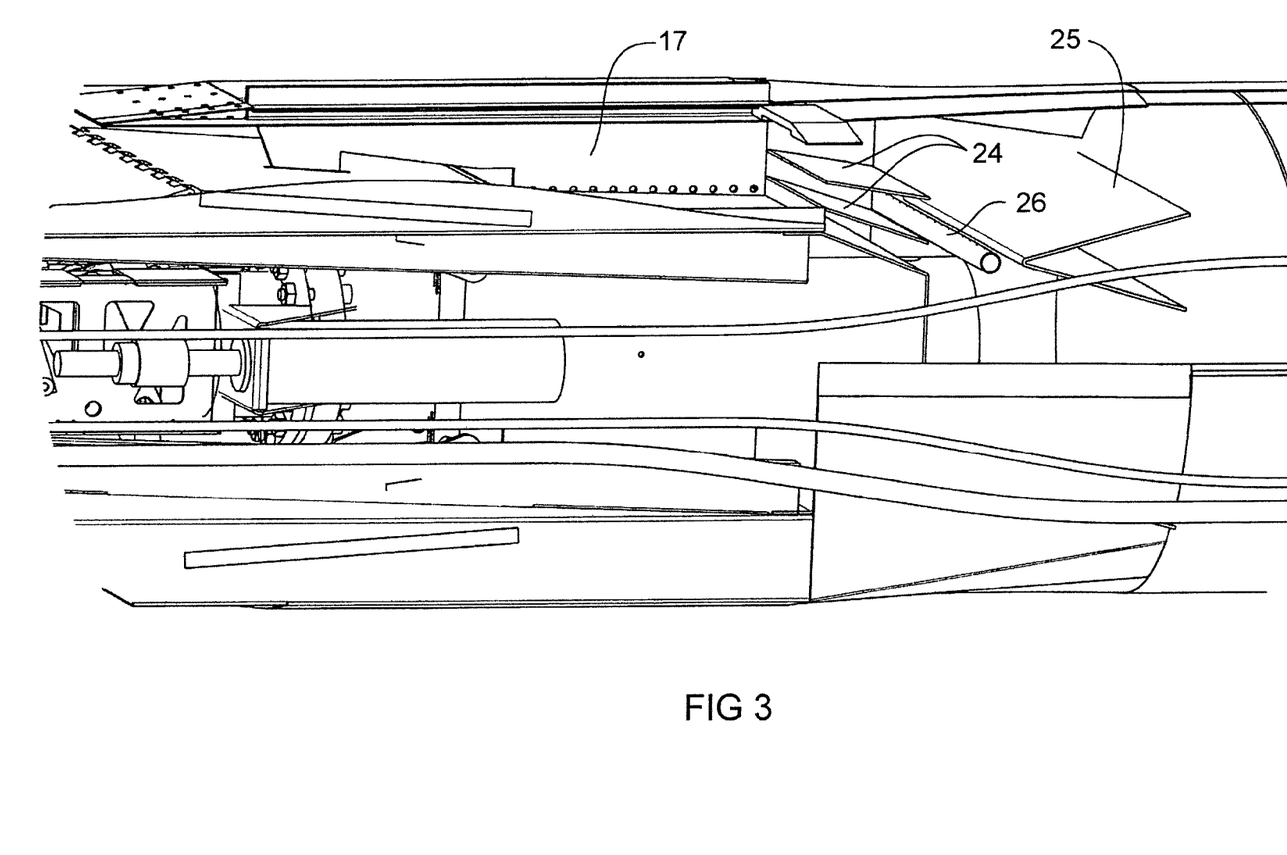
FIG. 3 is a detailed view of the intake.

FIG. 2 illustrates a series of guide plates 24 that guide the air passing through the intake 8 towards flame holders 25 in the combustion chamber 10. The guide plates 24 for the upper duct 17 are more clearly illustrated in FIG. 3 which also illustrates a fuel injector tubes 26 adjacent the flame holder 25. Fuel is ejected from the tube 26, mixes with the air from the duct 17, and passes over the outer surface of flame holder 25. It can be seen from FIG. 2 that equivalent guide plates 24, injector tube 26 and flame holder 25 is positioned in a lower duct 17 on the opposed side of the intake 8. Each flame holder 25 creates an eddy current as the air passes over a trailing edge of each flame holder 25 supports a region of localised low pressure. This localised low pressure promotes a flame which ignites the fuel injected over the flame holder 25. The combusted fuel creates gas which expands and is forced towards the nozzle 12(see FIG. 2).

Figure 4:
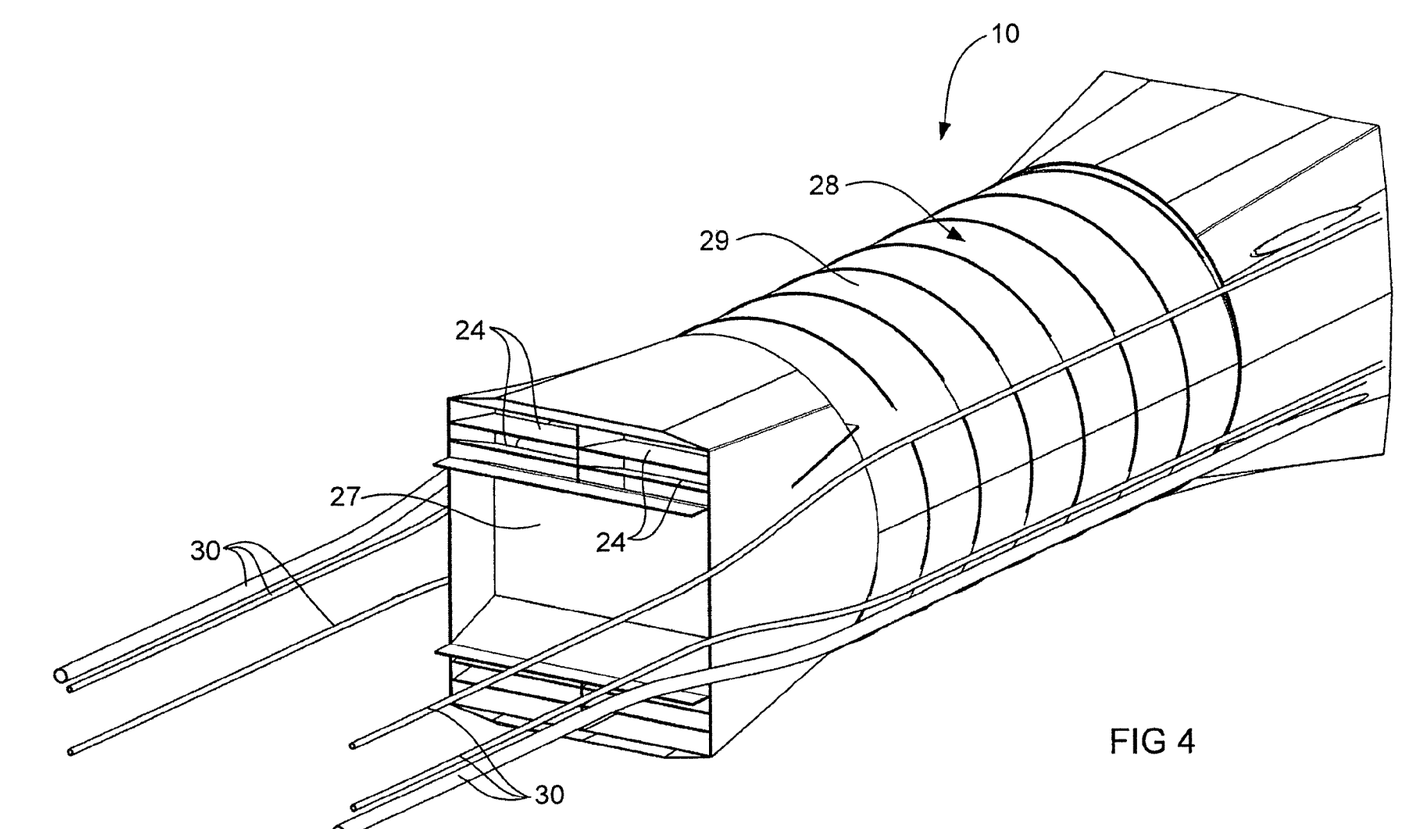
FIG. 4 is an isometric view of the combustion chamber.

FIG. 4 illustrates the guide plates 24 and a central opening 27 leading into the air fed combustion chamber 10. The central opening 27 is for allowing the exhaust gas from the rocket 8 to pass through the combustion chamber 10. Part of the outer skin of the combustion chamber 10 has been removed to reveal the inner wall 28. The inner wall 28 combines with the skin to form a conduit 29 (referred to in the claims as a third conduit) through which the fuel passes before it enters the combustion chamber 10 via the injector tube 26. The function of the conduit 29 is to again preheat the fuel and cool the wall 28 of the combustion chamber 10. Whilst FIG. 4 illustrates the conduit 29 as a helix it may take another form which is more or less tortuous. FIG. 4 also illustrates a number of pipes 30 extending down the side of the combustion chamber 10. These pipes 30 supply and return fuel to the empennage 11 (see FIG. 2) and will be discussed in greater detail with reference to later illustrations.

Figure 5:
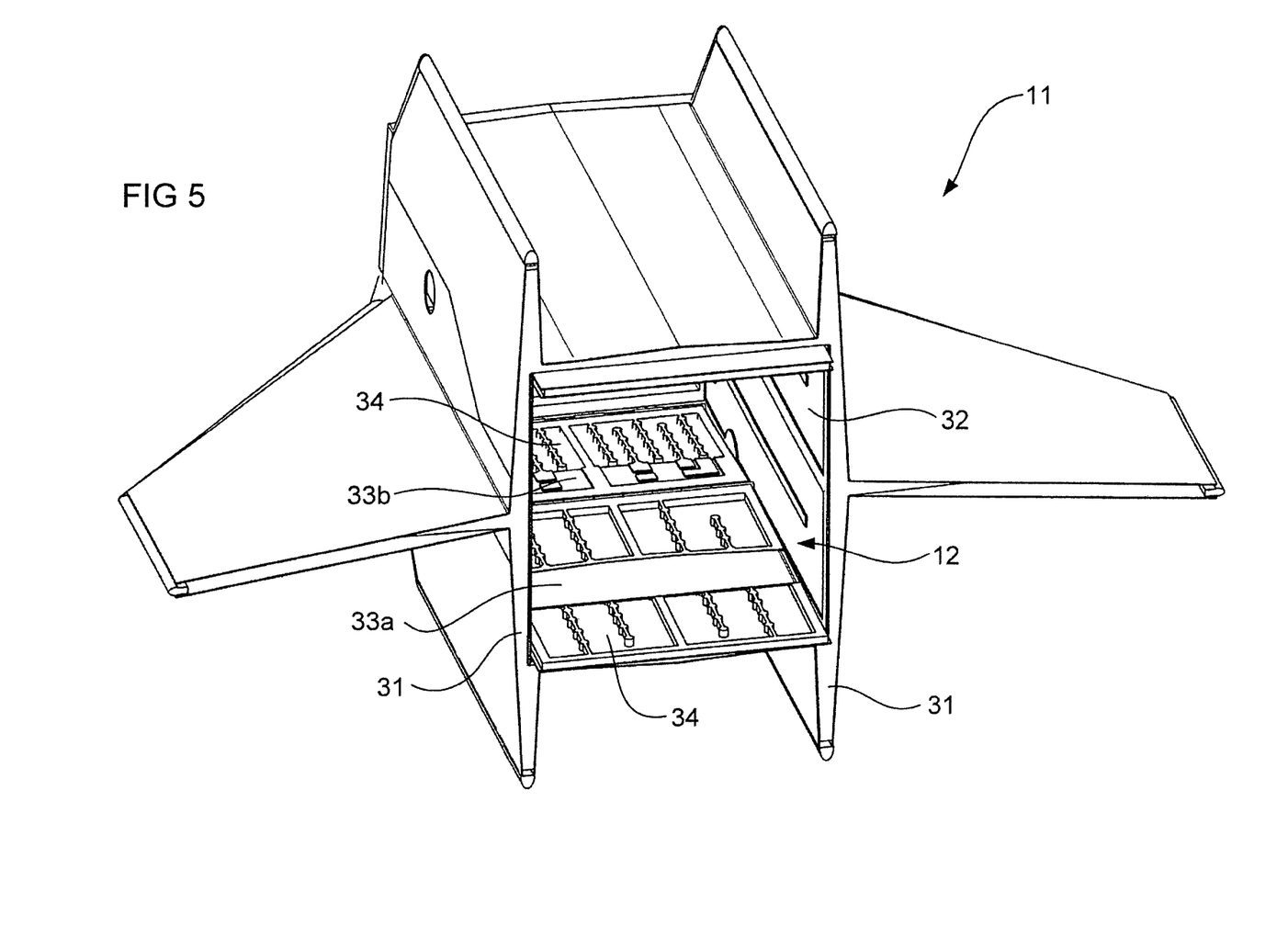
FIG. 5 is a rear isometric view of the empennage.

FIG. 5 illustrates a rear view of the empennage 11 and in particular the nozzle 12. The nozzle 12 is defined in part by a pair of sidewalls 31. FIG. 5 illustrates one of the side walls with an inner skin removed to show a conduit 32 (referred to in the claims as a fourth conduit). The fuel that flows through the pipes 30 illustrated in FIG. 4 is passed along the conduit 32 in the side wall 31. The conduit 32 defines a substantially tortuous path along which the fuel passes before it returns to the combustion chamber 10. The function of the conduit 32 is to again preheat the fuel and cool the side wall 31 of the nozzle 12.

FIG. 5 also illustrates a pair of lower panels 33a, 33b of the nozzle 12 with an inner skin removed. Upper panels are obscured in this view but they are identical to the lower panels 33a, 33b. FIG. 5 also illustrates the lower panels being formed with a conduit 34 (referred to in the claims as the first conduit) therein through which conduit 34 fuel passes before it enters the combustion chamber 10. The upper panel also preferably includes a conduit 34. It ought to be noted that the conduit 34 formed in each panel is tortuous. The function of the conduit 34 is to again preheat the fuel and cool the panels 33a, 33b of the nozzle 12.

It is preferred that each panel 33a, 33b be relatively adjustable to adjust the flow characteristics of the gas passing through the nozzle 12. This may be achieved in any suitable manner however in the embodiment illustrated in FIG. 6 the panels are articulated. The articulation of the panels can be appreciated by comparing FIGS. 2 and 6. The adjustment is achieved by operation of rams however this may vary.

Referring again to FIG. 2 which illustrates the engine 2 operating in a subsonic mode whereby the baffles 16 and panels 33 are substantially parallel with a longitudinal axis XX. In this mode the rocket 9 is operating by combusting the combination of liquid fuel and oxidizer to produce thrust. The rocket 9 will have its own ignition system which may be of a pyrotechnic or electric spark type (not shown). The combusted gas passes freely through the air fed combustion chamber 10 and the nozzle 12 until the aerial vehicle achieves a sustainable velocity/speed (hereinafter velocity). The sustainable velocity is at the bottom of the supersonic range at about mach 1.5, however this will vary at different altitudes. At the sustainable velocity the pressure of air due to the air entering the intake 8, is sufficiently high to raise the pressure of the air moving through the air combustion chamber 10. The fuel is then supplied to the air combustion chamber 10 and ignited off the heat from the rocket 9 exhaust. Alternatively the fuel may be ignited by some other source such as a pyrotechnic or electric spark (not shown). This other source of ignition may be desirable to avoid the situation where the flame drops out.

The pressure in the combustion chamber 10 is raised to a point where combustion of fuel in the air combustion chamber 10 creates an overall increase in momentum of air/gas through the engine 12 generating net thrust. The thrust becomes greater then drag on the vehicle 1, and the vehicle 1 will accelerate. Thereafter the baffles 16 of the intake 8 are adjusted along with the panels 33 of the nozzle 12 to control the pressure in the air combustion chamber 10 so as to enable the engine to operate as a ramjet at supersonic speeds as illustrated in FIG. 6. Naturally alterations may be made to the relative angles of the lead 16a, middle 16b and tail 16c portion of the baffles 16 and lead 33a and tail 33b banes of the nozzle 12 to increase efficiencies. This includes adjusting the intake 8 to move the position of the shock wave relative to the leading edge of the engine 2, and adjusting the nozzle 12 to compress the gasses in the air fed combustion chamber 10.

The inventor has appreciated that by positioning the rocket exhaust 22 relative to the intake 8 as hereinbefore described, it acts as an ejector rocket helping to draw air into the intake 3. This increases the likelihood that the aerial vehicle 1 will achieve a sustainable velocity in a more efficient manner.

Various alterations and/or additions may be introduced to the engine as hereinbefore described without departing from the spirit or ambit of the invention.

The claims defining the invention are as follows:

1. An engine for use in an aerial vehicle, the engine comprising:
   an air intake at a leading end of the engine,
   a nozzle at a tail end of the engine,
   an air fed combustion chamber that is fed air from the intake to burn liquid fuel and discharge from the engine through the nozzle,
   a rocket located proximate the intake that operates on the liquid fuel and an oxidizer, the rocket having an oxidizer fed combustion chamber within which the liquid fuel and oxidizer is burnt and an exhaust discharging the burnt fuel into the air fed combustion chamber, whereby the fuel is supplied to the oxidizer fed combustion chamber until the vehicle achieves a self sustaining velocity after which the fuel is supplied to the air fed combustion chamber, the air fed combustion chamber discharging into the nozzle,
   the nozzle including a rectilinear duct having at least one adjustable panel for adjusting the flow characteristics of the discharge moving through the nozzle, the at least one adjustable panel panel includes a first conduit formed therein through which conduit the fuel passes before the fuel enters said air fed combustion chamber, whereby heat is transferred from each panel to the fuel, and
   the intake including
      a substantially rectilinear duct, and
      a plurality of baffles which are adjustable in two dimensions and located on opposing sides of the intake for adjusting the flow characteristics of air interacting with the intake.

2. The engine according to claim 1 wherein each baffle is articulated and includes at least a lead portion and a tail portion that are relatively adjustable in an angle the lead portion makes with the tail portion.

3. The engine according to claim 2 wherein each baffle includes a middle portion positioned between the lead portion and the tail portion that is relatively adjustable in an angle the middle portion makes with the lead portion and the tail portion.

4. The engine according to claim 1 including a second conduit formed in a wall forming at least the oxidizer fed combustion chamber through which said second conduit the fuel passes before the fuel enters said chamber, whereby heat is transferred from the wall of said chamber to the fuel.

5. The engine according to claim 4 wherein the second conduit extends to a wall forming the exhaust.

6. The engine according to claim 4 wherein the second conduit defines a substantially helical path.

7. The engine according to claim 1 wherein discharge from the exhaust creates a venturi effect to draw air in through the intake duct.

8. The engine according to claim 1 including at least one fuel injector for injecting the fuel towards the air fed combustion chamber, at least one flame holder over which the air passes and causes an eddy current which supports an environment in which a flame for igniting the fuel can be maintained.

9. The engine according to claim 1 including a third conduit formed in a wall forming the air fed combustion chamber through which third conduit the fuel passes before the fuel enters said air fed combustion chamber, whereby heat is transferred from the wall of said air fed combustion chamber to the fuel.

10. The engine according to claims 9 wherein the third conduit defines a substantially helical path.

11. The engine according to claim 1 wherein the nozzle includes a plurality of panels which are located on opposing sides of said duct.

12. The engine according to claim 11 wherein each panel is articulated and includes at least a lead portion and a tail portion that are relatively adjustable in an angle the lead portion makes with the tail portion.

13. The engine according to claim 12 wherein the nozzle includes side walls that extend substantially perpendicular to and on opposing sides of the panels, each side wall including a fourth conduit formed therein through which fourth conduit the fuel passes before the fuel enters either of said air fed or oxidizer fed combustion chambers, whereby heat is transferred from each side wall to the fuel.

14. The engine according to claim 13 wherein each fourth conduit defines a tortuous path.

15. The engine according to claim 1 wherein the rocket is an ejector rocket.

* * * * *